United States Patent
Reeser et al.

(10) Patent No.: US 6,789,050 B1
(45) Date of Patent: Sep. 7, 2004

(54) METHOD AND APPARATUS FOR MODELING A WEB SERVER

(75) Inventors: Paul Kevin Reeser, Red Bank, NJ (US); Rema Hariharan, Scotch Plains, NJ (US); Rob Van Der Mei, Amsterdam (NL)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/466,963

(22) Filed: Dec. 20, 1999

Related U.S. Application Data

(60) Provisional application No. 60/113,816, filed on Dec. 23, 1998.

(51) Int. Cl.[7] .............................. G06F 7/60; G06F 9/44; G06F 9/45; G06F 17/50; G06F 17/10
(52) U.S. Cl. .............................. 703/2; 703/21; 703/22; 703/13; 702/186; 702/181; 702/179; 709/220; 709/223; 709/224; 370/412; 370/229
(58) Field of Search ............................... 703/2, 22, 21, 703/13, 14, 17, 19, 23, 24; 702/186, 181, 179; 709/220, 223, 224, 225, 226, 250; 370/230, 231, 412, 229

(56) References Cited

U.S. PATENT DOCUMENTS

| | | | | |
|---|---|---|---|---|
| 4,616,359 A | * | 10/1986 | Fontenot | 370/230 |
| 5,197,127 A | * | 3/1993 | Waclawsky et al. | 709/224 |
| 5,381,404 A | * | 1/1995 | Sugano et al. | 370/238 |
| 5,570,346 A | * | 10/1996 | Shur | 370/231 |
| 5,583,792 A | * | 12/1996 | Li et al. | 709/224 |
| 5,784,596 A | * | 7/1998 | Melamed et al. | 703/2 |
| 5,799,173 A | * | 8/1998 | Gossler et al. | 703/21 |
| 5,852,449 A | * | 12/1998 | Esslinger et al. | 345/473 |
| 5,867,734 A | * | 2/1999 | Drews | 710/52 |
| 5,923,873 A | * | 7/1999 | Massey et al. | 718/100 |
| 5,974,572 A | * | 10/1999 | Weinberg et al. | 714/47 |
| 5,978,574 A | * | 11/1999 | Sharma | 703/20 |
| 6,072,800 A | * | 6/2000 | Lee | 370/230 |
| 6,072,946 A | * | 6/2000 | Dooley et al. | 703/13 |
| 6,134,514 A | * | 10/2000 | Liu et al. | 703/17 |
| 6,138,157 A | * | 10/2000 | Welter et al. | 709/224 |
| 6,157,940 A | * | 12/2000 | Marullo et al. | 703/27 |
| 6,240,463 B1 | * | 5/2001 | Benmohamed et al. | 709/238 |
| 6,295,557 B1 | * | 9/2001 | Foss et al. | 709/224 |
| 6,311,144 B1 | * | 10/2001 | Abu El Ata | 703/2 |
| 6,314,463 B1 | * | 11/2001 | Abbott et al. | 709/224 |
| 6,324,492 B1 | * | 11/2001 | Rowe | 703/13 |
| 6,393,386 B1 | * | 5/2002 | Zager et al. | 703/25 |
| 6,393,480 B1 | * | 5/2002 | Qin et al. | 709/224 |
| 6,421,808 B1 | * | 7/2002 | McGeer et al. | 716/1 |
| 6,446,120 B1 | * | 9/2002 | Dantressangle | 709/224 |

OTHER PUBLICATIONS

Bertsekas et al., Data Networks, Second Edition, Simon & Schuster, 1992., cover chapter 3 index, chapter 3, pp. 149–269.*

Menasce et al., Capacity Planning for Web Performance, Metrics, Models and Methods, Jun. 1998, entire book.*

Menasce et al., Capacity Planning and Performance Modeling, from Mainframes to Client–Server Systems, 1994, entire book.*

* cited by examiner

Primary Examiner—William Thomson

(57) ABSTRACT

A method and apparatus for modeling a web server is described. The web server is modeled by identifying a plurality of sub-systems for the server. Each sub-system is represented as a queue, with each queue operably coupled to one another. An arrival rate and a service time is iteratively adjusted for each queue to account for performance by the other queues.

14 Claims, 10 Drawing Sheets

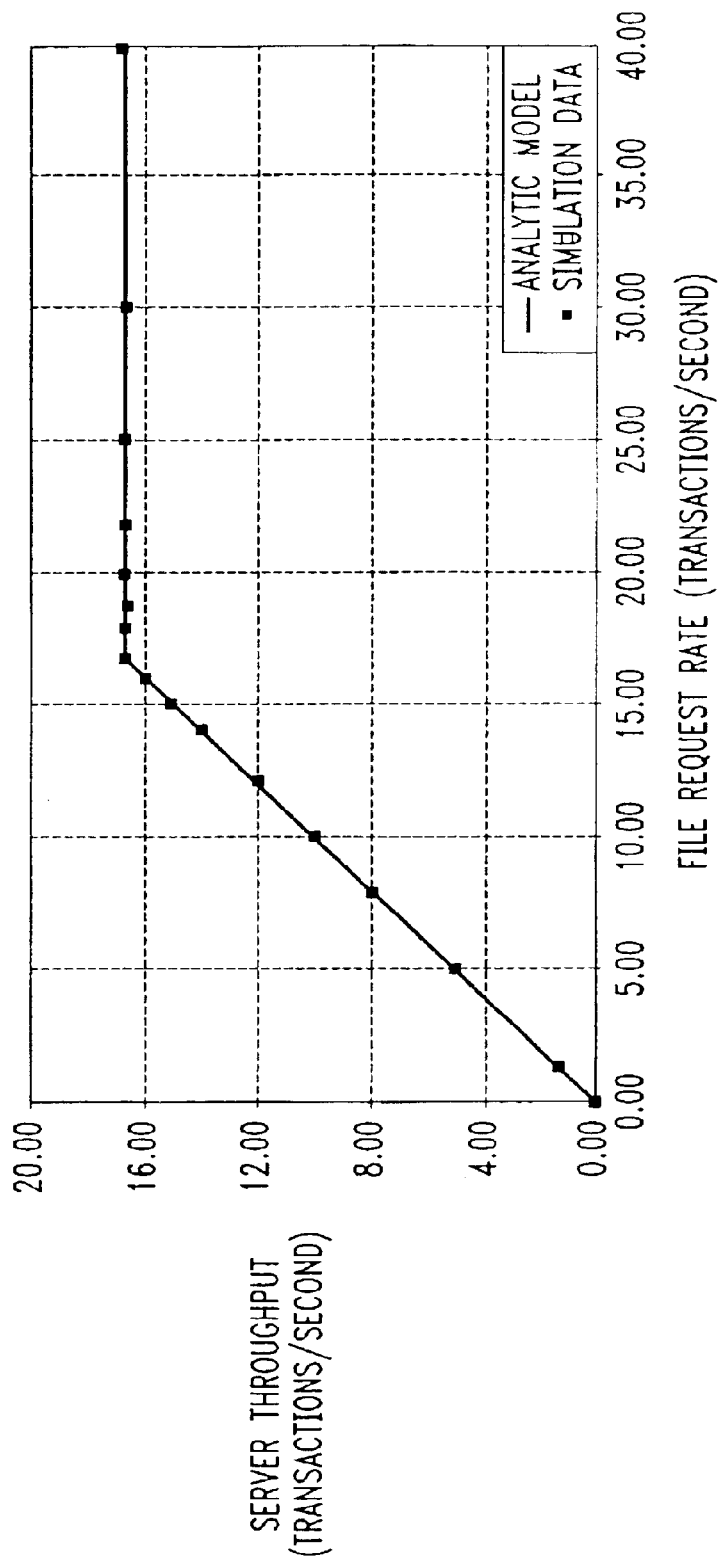

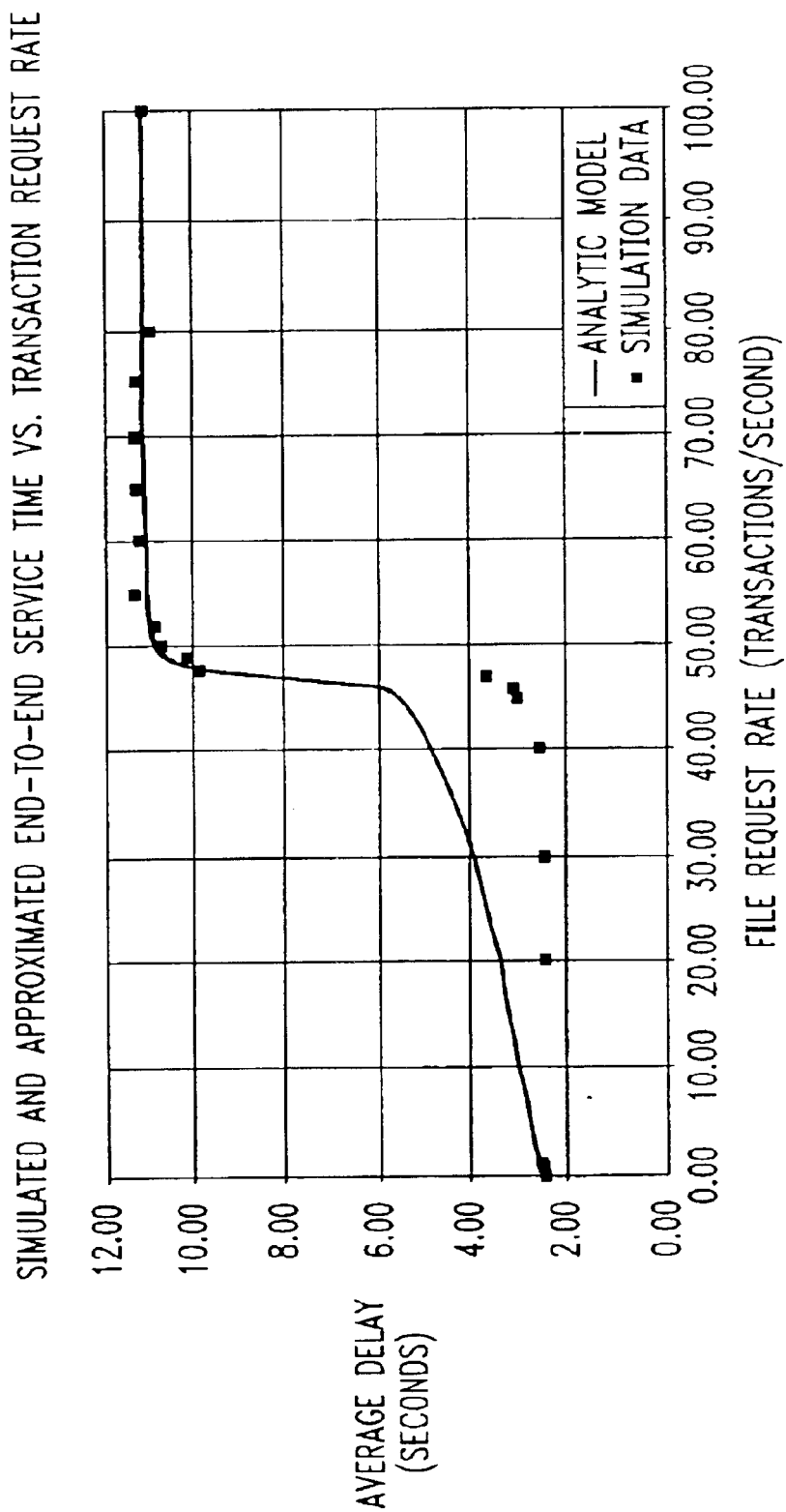

METHOD AND APPARATUS FOR MODELING A WEB SERVER

CROSS-REFERENCES TO RELATED APPLICATIONS

This application claims the benefit of U.S. Provisional Application No. 60/113,816, filed Dec. 23, 1998, entitled "An Analytical Model For A Web Server," the entire disclosure of which is incorporated by reference herein.

FIELD OF THE INVENTION

The invention relates to communication devices in general. More particularly, the invention relates to a method and apparatus for building an analytic model for a web server.

BACKGROUND OF THE INVENTION

Over the past few years, the World Wide Web ("Web") has seen tremendous growth, which is unlikely to slow down in the near future. The explosion of Internet Commerce and Telephony services brought the heretofore distinct Internet space into the realm of traditional telecommunications, and ensured that the Web will remain at the center of mainstream communications. At the heart of most Internet Commerce and Telephony service offerings is the Web server. Based on the Hypertext Transfer Protocol (HTTP) over the Transaction Control Protocol/Internet Protocol (TCP/IP), Web servers are expected to perform millions of requests per day at an acceptable Quality of Service (QoS) in terms of transaction throughput (connect and error rates) and latency (connect and response times) experienced by end users. To cope with the increasing volume of transaction requests, as well as the increasing demands of real-time communications, a thorough understanding of the performance capabilities and limitations of Web servers is crucial.

Web server performance is a complicated interplay between a variety of components, such as server hardware platform, Web server software, server operating system, network bandwidth, workload characteristics, disk caching, etc. Experience has shown that the performance of Web servers can be increased tremendously by the proper tuning of the server components. To properly configure these different components, however, it is crucial to understand how these components interact and how they impact user-perceived end-to-end performance.

To compare the performance of Web server platforms, numerous benchmarking tools have been brought to the market. The existing benchmarking tools, however, have a number of drawbacks. First, these tools consider the Web server as a "black box", and as such fail to provide insight into how the individual components impact end-to-end performance. Second, benchmarking is extremely time-consuming, and experiments must be performed for many different workload scenarios. Third, benchmarking tools typically run on a workstation connected to a Web server, via a high-speed LAN, whereas in practice Internet-based end users are connected to the Web server via low-speed modems. Therefore, applying the outcomes of benchmarking experiments as an estimation of the actual Web server performance capabilities may lead to erroneous performance predictions.

In view of the foregoing, it can be appreciated that a substantial need exists for a method and apparatus which can evaluate and compare the performance of Web server platforms in an efficient and effective manner in order to solve the aforementioned problems.

SUMMARY OF THE INVENTION

The embodiments of the invention include a method and apparatus for modeling a web server. The server is modeled by identifying a plurality of sub-systems for the server. Each sub-system is represented as a queue, with each queue operably coupled to one another. An arrival rate and a service time is iteratively adjusted for each queue to account for performance by the other queues.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

FIGS. 3($b$), 4($b$) and 5($b$) show the average end-to-end service time $\tau_{conn}+\tau_{resp}$ as a function of the TRR under different workload and network scenarios.

DETAILED DESCRIPTION

Figure 1:
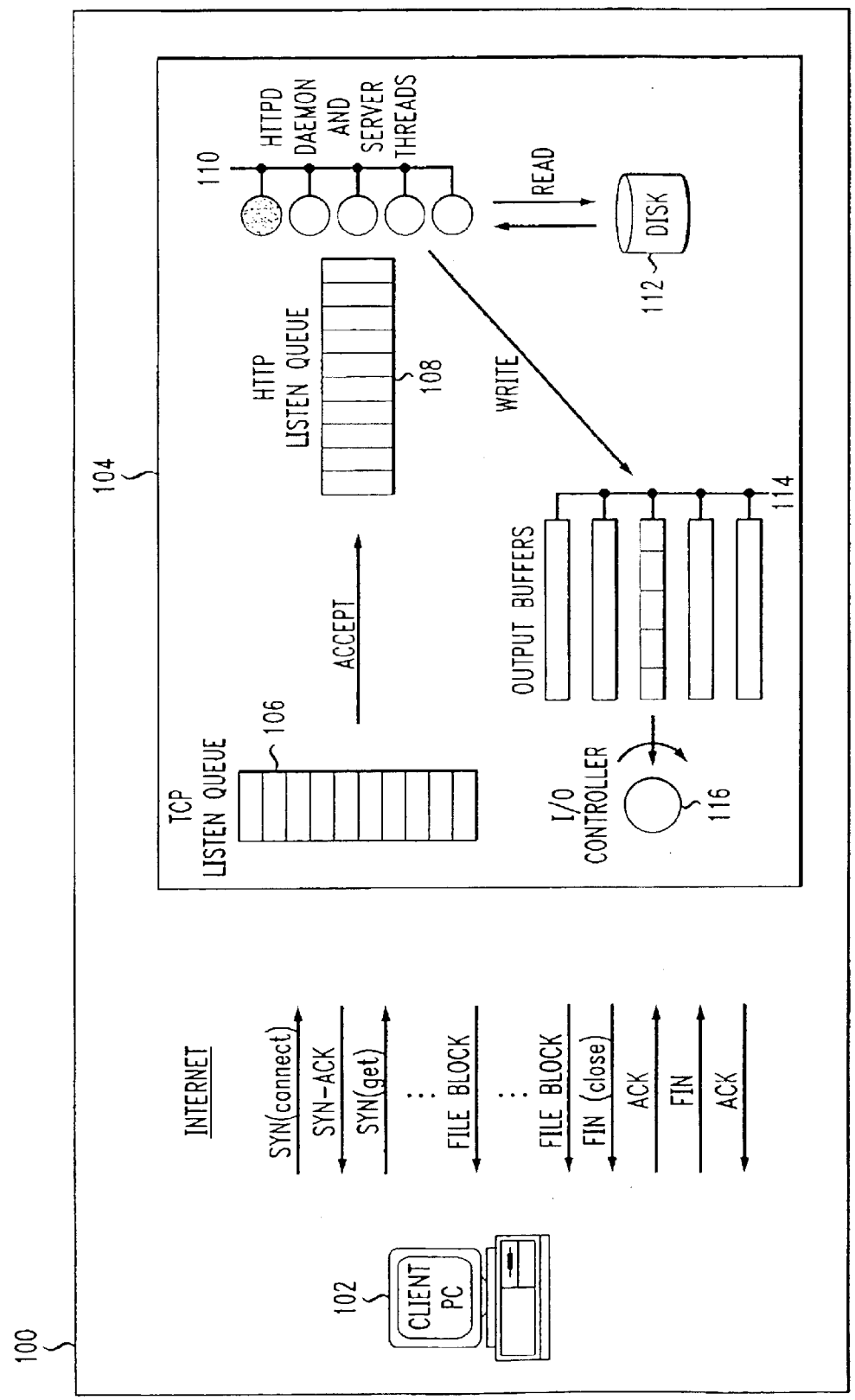
FIG. 1 is a communication system model which illustrates the flow of a typical HTTP transaction (file request) through a Web server.

The performance of a Web server is a complex interplay between the variety of components, for which previous performance predictions could only be obtained via time-consuming simulation To overcome this problem, the embodiments of the invention present a model that captures key performance limiting factors of an HTTP server, while keeping the model simple enough to be exactly analyzable. The results lead to fast-to-evaluate approximations of the key performance measures of the Web server, like the server throughput, the end-to-end service time, and the blocking probabilities. The approximations are shown to be accurate in a variety of realistic scenarios. Based on these observations, the approximate predictions form an excellent basis for the development of Decision Support Systems for the configuration tuning and sizing of Web servers.

The embodiments of the invention are useful for the modeling and analysis of the impact of the different components on Web server performance. Accordingly, the embodiments of the invention describe a new analytic model for Web servers. HTTP transactions proceed along a number of phases in successive order. Therefore, the HTTP flows within a Web server can be described by a tandem queueing model consisting of the following sub-models:

a multi-server, zero-buffer blocking model for the TCP/IP connection setup phase;

a multi-server, finite-buffer queueing/blocking model for the HTTP server processing; and a multi-server, infinite-buffer queueing model for the network I/O sub-system.

The embodiments of the invention provide a tractable analytic model of the intricate dependencies and interactions between the sequential Web server sub-systems by decoupling the sub-systems, while at the same time accurately capturing the impacts of "downstream" congestion. The resulting model consists of a sequence of independent, yet coupled, queues, where the arrival rates and service times at each node are iteratively adjusted to account for downstream performance.

The embodiments of the invention are described using the following notations:

Let $M(\lambda)/M(\tau)/N/Q$ denote the classical Markovian model with N servers, finite buffer size Q, First Come First Serve (FCFS) discipline, Poisson arrivals (rate $\lambda$), and exponential service times (mean $\tau$);

Denote by $\pi$ the probability that all servers are busy, and denote by $\beta$ the probability that all servers and buffers are occupied.

Let n be the average number of occupied servers, let q be the average queue length, and let $\omega$ be the average waiting time in queue.

Note that when Q=0, $\beta$ represents the Erlang B ("blocked calls cleared") formula, and when Q=$\infty$, $\pi$ represents the Erlang C ("blocked calls delayed") formula.

The embodiments of the invention can be implemented using a processor-based personal computer (PC) system and computer program segments stored in memory that when executed by the processor performs the functionality described herein. The processor can be any processor capable of providing the speed and functionality of the embodiments of the invention. For example, processor 202 could include the Pentium® family of processors made by Intel Corporation, or the 68XXX family of processors made by Motorola. Further, the computer program segments can be stored on any machine readable medium capable of storing instructions adapted to be executed by a processor. Some examples of such machine readable media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM), and any other device that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor. In addition, although this embodiment of the invention implements the functionality of these modules in software, it can be appreciated that the functionality of these modules may be implemented in hardware, software, or a combination of hardware and software, using well-known signal processing techniques.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Referring now in detail to the drawings wherein like parts are designated by like reference numerals throughout, there is illustrated in FIG. 1 a communication system model which illustrates the flow of a typical HTTP transaction (file request) through a Web server. As indicated in FIG. 1, the transaction proceeds through three successive phases: (1) TCP/IP connection setup between a client personal computer (PC) 102 and a Web server 104; (2) HTTP file access; and (3) network Input/Output (I/O) processing. Each transaction flow is discussed in detail below. It is worthy to note that only "static" file access is used for clarity in describing the principles of the embodiments of the invention. It can be appreciated, however, that the analytical model can be modified to include a "dynamic" script execution sub-system and still fall within the scope of the invention. Such an embodiment is depicted, for example, in FIG. 6 as well as in the flow diagram in FIG. 8.

FIG. 1 models three different sub-systems of a Web server 104, with each sub-system corresponding to a particular phase of a typical HTTP transaction. The sub-systems include a TCP/IP sub-system, an HTTP sub-system, and an I/O subsystem.

The TCP/IP sub-system consists of a finite Listen Queue (LQ) 106 of size $N_{tcp}$, served by a "listener" daemon (in the case of HTTP traffic, "httpd"). Prior to data transmission, a two-way connection (socket) must be established between a client personal computer (PC) 102 and Web server 104. It is assumed that incoming connection requests form a Poisson process with rate $\lambda_{file}$ (in files/second). Incoming requests remain in the TCP LQ 106 until the socket is established via a "three-way handshake" as follows:

The client PC 102 TCP stack sends a connect request (SYN) to Web server 104;

If there is an available slot in TCP LQ 106, then the request occupies one slot, and the listener daemon sends an acknowledgment (SYN-ACK) to client PC 102; otherwise, the connection request is rejected, and Web server 104 sends a "connection refused" message to client PC 102; and Upon receipt of Web server 104's acknowledgment (SYN-ACK), client PC 102 acknowledges Web server 104's SYN with an ACK. The two-way TCP socket connection is now established.

Client PC 102 follows the ACK with an HTTP request (e.g., GET, POST, HEAD). Upon receipt of the HTTP request, HTTP daemon 110 accepts the request (discussed in the next section), and the request is removed from TCP LQ 106. Eventually, after the HTTP request is processed and the last I/O buffer block is transmitted, Web server 104 closes its half of the TCP socket (FIN). Upon receipt of the FIN, client PC 102 sends an ACK, followed by a FIN. Upon receipt of the FIN, Web server 104 sends an ACK, and the socket is closed.

The actual daemon service time to process the connect( ) and accept( ) requests is negligible; therefore, the fact that there is one "server" is inconsequential. Rather, TCP LQ 106 behaves like a group of $N_{tcp}$ separate servers, where the "holding" time for each request in TCP LQ 106 consists of one network round-trip time (RTT). It is assumed that the TCP holding time (network RTT) is exponentially distributed with mean $\tau_{tcp}$ (in seconds). Thus, the TCP/IP sub-system can be modeled as an $M(\lambda_{file})/M(\tau_{tcp})/N_{tcp}/0$ blocking system.

Figure 2:
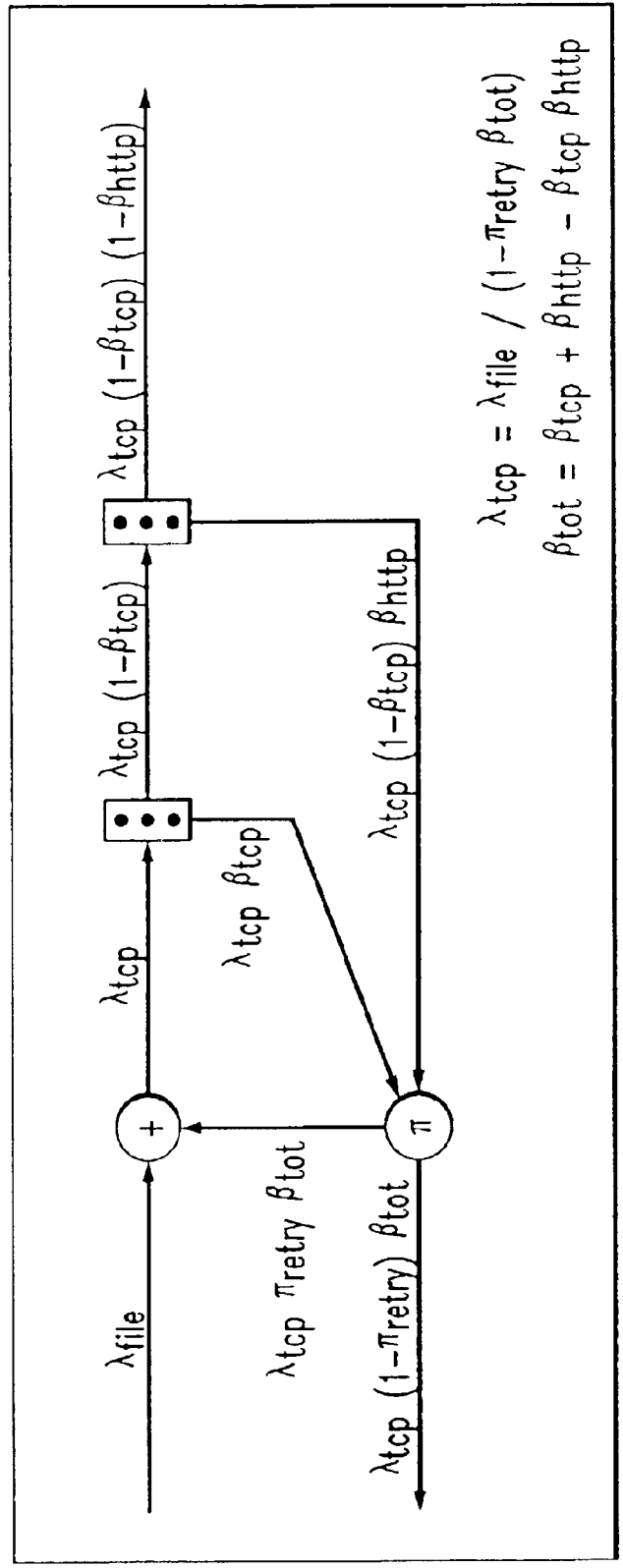
FIG. 2 depicts the detailed feedback mechanism within the HTTP sub-system.

Incoming requests that arrive when all $N_{tcp}$ LQ slots are occupied are blocked ("connection refused"), and retry with fixed probability $\pi_{retry}$. Reattempts are accounted for by inflating the offered load, as shown in FIG. 2. The total offered load $A_{tcp}$ (including reattempts) is given by $A_{tcp} = \lambda_{file}\tau_{tcp}/(1-\pi_{retry}\beta_{tot})$, where $\beta_{tot}=\beta_{tcp}+\beta_{http}-\beta_{tcp}\beta_{http}$ is the total (TCP+HTTP) LQ blocking of incoming requests. The probability of blocking $\beta_{tcp}$ at the TCP LQ, the average number $n_{tcp}$ of occupied TCP LQ slots, and the effective file request rate $\lambda_{http}$ at the downstream HTTP sub-system then follow directly from basic M/M/N/0 results.

It is worthy to note that the impact of "downstream" congestion on the TCP/IP sub-system is captured in the calculation of the total offered load $A_{tcp}$ (through the reattempt stream), which in turn impacts the calculations of the TCP LQ blocking $\beta_{tcp}$ and total (TCP+HTTP) LQ blocking $\beta_{tot}$. The HTTP sub-system consists of a LQ 108 of size $Q_{http}$ served by one or more multi-threaded HTTP daemons (httpd) 110 with $N_{http}$ separate server threads. After the TCP connection is established and the HTTP request is received, the HTTP daemon issues an accept( ) request. If an HTTP server thread is available, then the request goes directly into service. Otherwise, if an HTTP LQ 108 slot is available, then the request waits for a server thread in FCFS order in HTTP LQ 108. Otherwise, the HTTP daemon rejects the request ("connection refused"), and the TCP connection is torn down.

Once the HTTP request enters service, the server thread reads the blocks of the requested file (either from cache or disk), and writes them to the I/O sub-system as follows: If a network output buffer is available, then the thread immediately begins to write the file into the output buffer. Otherwise, the thread waits (blocks) for an output buffer in FCFS order. Once an output buffer becomes available, the server thread begins to write the file into the buffer. If the file fits entirely into the buffer in one pass, the thread is released. Otherwise, the server thread waits (blocks) until the entire output buffer is drained, at which point the thread resumes writing the file (to the same output buffer). Eventually, the remainder of the file fits entirely into the buffer in the last pass, and the server thread is released and becomes available to handle another request.

The average thread holding time $\tau_{http}$ consists of the time $\tau_{read}$ to access each of the file blocks (from cache or disk), plus the time $\omega_{ioq}$ that the thread is blocked waiting for an output buffer to become available (in the case that all output buffers are occupied), plus the time $\omega_{buf}$ that the thread is blocked waiting to refill the output buffer (in the case that the file does not fit entirely in one pass). The average file access time $\tau_{read}$ is given by $\tau_{read}=n_{file}[\pi_{chr}\tau_{cache}+(1-\pi_{chr})\tau_{disk}]$, where $n_{file}$ is the file size (in blocks), $\pi_{chr}$ is the probability that the block resides in cache, $\tau_{cache}$ is the average cache access time per block, and $\tau_{disk}$ is the average disk access time per block. Assuming that file size is geometrically distributed, the average waiting time $\omega_{buf}$ to refill the output buffer is given by $\omega_{buf}=N_{iob}\tau_{iob}\pi_{buf}/(1-\pi_{buf})$, where $\tau_{iob}$ is the average block service time.

It is assumed that incoming HTTP requests form a Poisson process with rate $\lambda_{http}$ each with an exponentially distributed thread holding time with mean $\tau_{http}$. The HTTP sub-system is modeled as an $M(\lambda_{http})/M(\tau_{http})/N_{http}/Q_{http}$ queueing system. Incoming requests that arrive when all $Q_{http}$ LQ slots are occupied are blocked ("connection refused"), and retry with probability $\pi_{retry}$. As before, reattempts are accounted for by inflating the offered load (see FIG. 2). The total offered load $A_{http}$ (including reattempts) is given by $A_{http}=\lambda_{file}\tau_{http}(1-\beta_{tcp})/(1-\pi_{retry}\beta_{tot})$. The probability of blocking $\beta_{http}$ at the HTTP LQ, the average number $q_{http}$ of occupied HTTP LQ slots, the average waiting time $\omega_{http}$ in the HTTP LQ, the average number $n_{http}$ of occupied HTTP threads, and the effective file request rate $\lambda_{buf}$ at the I/O controller sub-system then follow directly from basic M/M/N/Q results.

It is worthy to note that the impact of "downstream" congestion on the HTTP sub-system (in terms of both I/O buffer size and occupancy) is captured in the calculation of the average thread holding time $\tau_{http}$.

The I/O sub-system consists of a finite number $N_{buf}$ of network buffers 114, served by a single I/O controller (IOC) 116 in round-robin (polling) fashion. Once the server thread writes the file into an output buffer 114, IOC 116 begins to write the blocks over the TCP connection as follows: IOC 116 sends one TCP window's worth of data to client PC 102, and waits for an acknowledgment. Once the ACK is received and IOC 116 returns to an output buffer 114, another window's worth of data is sent to client PC 102, and so on, until the entire file is written.

The TCP flow control mechanism described above is a complicated interplay between the server maximum segment size (MSS), network message transfer unit (MTU), window size, "slow start" algorithm, and so forth. The TCP window size between Web server 104 and client PC 102 using a 28.8 Kbps modem typically ranges between an initial slow-start value of 1 MTU, and an optimal value of 3–4 MTUs. A typical scenario could proceed as follows: Web server 104 sends 1 MTU (receives ACK from client PC 102), sends 2 MTUs (receives ACK), sends 4 MTUs (encounters network congestion and backs off), resends 2 MTUs (receives ACK), and so forth. Therefore, a typical flow to send 10 MTU's worth of data could consist of five cycles with 1, 2, 2, 2, and 3 MTUs, with an average of 2 MTUs per cycle. For simplicity, it is assumed that each block of a file consists of 2 MTUs, and that the TCP window size is 2 MTUs on average. Therefore, IOC 116 sends an average of 1 block per cycle.

It is assumed that incoming requests form a Poisson process with rate $\lambda_{buf}$ each with an exponentially distributed buffer service time with mean $\tau_{buf}$. The I/O sub-system is modeled as an $M(\lambda_{buf})/M(\tau_{buf})/N_{buf}/\infty$ queueing system, where the average buffer service time $\tau_{buf}$ captures the impact of the round-robin I/O controller. Specifically, the average service time $\tau_{iob}$ for each block is determined as follows: Assume that a server thread places the requested file in the output buffer at an arbitrary time t. The time to service the first block then consists of the residual cycle time $\tau_{ioc}$ for IOC 116 to arrive at the buffer in question, plus the time $\tau_{link}$ to put the block on the output link, plus the modem time $\tau_{mod}$ to read the block, plus the network RTT $\tau_{tcp}$ to send the block and return the ACK. Once the ACK arrives at Web server 104 (at time $t+\tau_{iob}$), the window is opened, and the next block is available for service (and so on). Thus, each block sees the same average service time $\tau_{iob}=\tau_{ioc}+\tau_{link}+\tau_{tcp}+\tau_{mod}$, and the average buffer service time $\tau_{buf}=n_{file}\tau_{iob}$.

The residual cycle time $\tau_{ioc}$ consists of the time to service all residual non-empty buffers whose TCP windows are open. Assuming that the number of non-empty buffers is uniformly distributed, the average residual cycle time $\tau_{ioc}=\frac{1}{2}n_{buf}\pi_{win}\tau_{link}$, where $n_{buf}$ is the average number of occupied buffers and $\pi_{win}$ is the probability that the ACK has arrived since the last IOC visit (hence, the TCP window is open). Applying basic M/M/N/$\infty$ results, the average number of occupied buffers $n_{buf}=\lambda_{buf}n_{file}\tau_{iob}$. Solving for $\tau_{iob}$ yields $\tau_{iob}=(\tau_{link}+\tau_{tcp}+\tau_{mod})/(1-\frac{1}{2}\lambda_{buf}n_{file}\pi_{win}\tau_{link})$. The probability that the window is open equals the probability that the ACK time is less than the complete cycle time. Assuming that the network RTT is exponentially distributed with mean $\tau_{tcp}$, then $\pi_{win}=1-\exp\{(\tau_{mod}-n_{buf}\pi_{win}\tau_{link})/\tau_{tcp}\}$ for $n_{buf}\pi_{win}\tau_{link}\geq\tau_{mod}$. Since $\pi_{win}-1$ under heavy server load, it can be conservatively assumed that $\pi_{win}=1$. Thus, $\tau_{iob}=(\tau_{link}+\tau_{tcp}+\tau_{mod})/(1-\frac{1}{2}\lambda_{buf}n_{file}\tau_{link})$. Finally, the probability $\pi_{ioq}$ of finding all output buffers occupied, the average number $q_{ioq}$ of server threads that are blocked waiting (queueing) for a network output buffer, and the average time $\omega_{ioq}$ that the thread is blocked (queued) then follow directly from basic M/M/N/$\infty$ results.

The system of equations defined above can be solved iteratively as follows: (1) compute the upper bound (worst case) I/O sub-system performance by assuming that no requests are blocked in the TCP/IP or HTTP sub-systems, then compute the upper bound (worst case) TCP/IP and HTTP sub-system performance by assuming the value for the I/O buffer waiting time computed above; (2) compute the lower bound (best case) I/O performance by assuming the values for blocking computed above, then compute the lower bound (best case) TCP/IP and HTTP performance by assuming the value for I/O waiting time computed above; and (3) repeat steps (1) and (2) to generate successively tighter bounds until convergence.

Once the iteration is complete, the end-to-end, user-perceived performance metrics are computed. First, the average user-perceived file "connect" time consists of the TCP/IP service time, plus the HTTP waiting time, $\tau_{conn} = \tau_{tcp} + \omega_{http}$. The average user-perceived file "response" time consists of the HTTP service time, plus the I/O waiting and service times, $\tau_{resp} = \tau_{read} + \omega_{ioq} + \tau_{buf}$. The end-to-end service time is then the sum of connect+response times, $\tau_{conn} + \tau_{resp}$. The effective file connect rate $\lambda_{conn} = \lambda_{file}(1-\beta_{tcp})(1-\beta_{http})/(1-\pi_{retry}\beta_{tot})$, and the effective file error (blocking) rate $\lambda_{error} = \lambda_{file} - \lambda_{conn} = \lambda_{file}(1-\pi_{retry}\beta_{tot})$.

The computation time required to obtain the approximations according to the steps outlined above is typically less than a second, whereas to obtain accurate predictions of the performance of Web server 104 by means of conventional techniques such as simulation on a modern work station is on the order of hours.

Various numerical experiments were used to validate the accuracy of the analytic approximation used in the embodiments of the invention. For a number of realistic scenarios the server throughput and the average end-to-end service time were computed by means of both simulation and analytic approximation.

For example, consider the following realistic scenario wherein a Web server is connected to the Internet via a T1.5 (1.544 Mbps) connection. Clients are connected to the Internet via 28.8 Kbps modems. The RTT for ACKs to move back and forth between the server and client is exponentially distributed with mean 250 ms. The Web server runs on a single processor. The size of the TCP LQ is 1024, the size of the HTTP LQ is 128, and the number of HTTP worker threads is 128. The MTU size is 512B, and no reattempts are allowed. The total processor time required by an HTTP thread to perform the HTTP layer processing is 15 ms per (1 KB) block. The average output file size is 4 KB (thus, the required processor time is 60 ms/file). The number of I/O buffers is 256. The scenario described above is typical and realistic for clients connected to a Web server via the Internet.

Figure 3B:
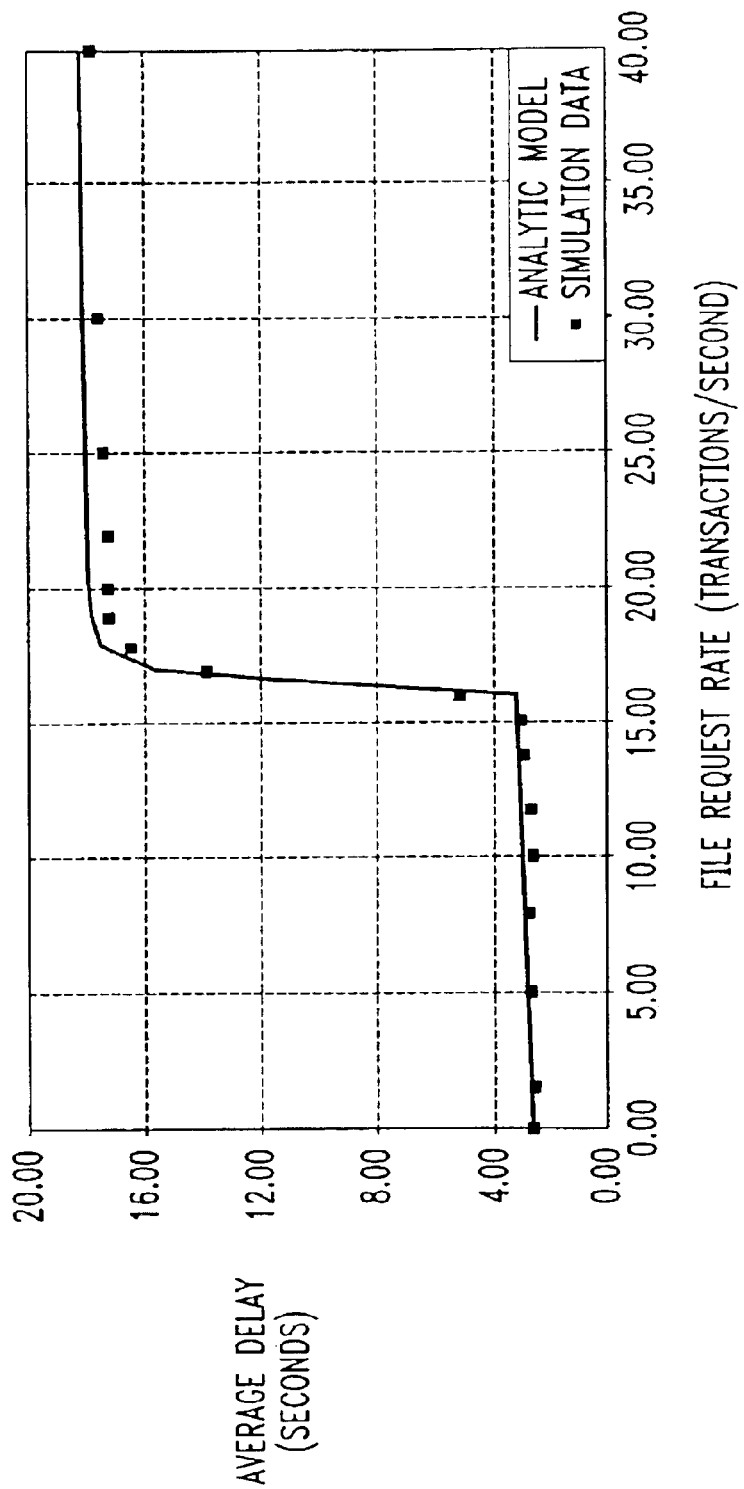
FIGS. 3($a$), 4($a$) and 5($a$) depict the effective server throughput $\lambda_{conn}$ as a function of the transaction request rate (TRR) $\lambda_{file}$ under different workload and network scenarios.

To assess the accuracy of the analytic approximation, the average server throughput and the average end-to-end service time for a variety of transaction request rates were computed. FIG. 3(*a*) depicts the effective server throughput $\lambda_{conn}$ as a function of the transaction request rate (TRR) $\lambda_{file}$, and FIG. 3(*b*) shows the average end-to-end service time $\tau_{conn} + \tau_{resp}$ as a function of the TRR.

The results in FIGS. 3(*a*) and 3(*b*) yield a number of interesting observations. First, it is observed that for increasing values of TRR, the throughput increases linearly up to some threshold T*, and remains constant when TRR exceeds this threshold. It is readily verified that T* corresponds to the performance limitation of the HTTP layer processing. More precisely, since the amount of CPU time required is 0.06 sec/file, and the number of processors is 1, the processor saturates when the throughput T*=1/0.06≈17 transactions/sec (Tps). As for end-to-end delay, FIG. 3(*b*) shows that the service time is fairly constant for TRR values smaller than T* and "jumps" to a higher constant when TRR exceeds T*. In those cases blocking at the HTTP sub-system occurs, leading to connection rejections. As for the accuracy of the analytic approximations, it is observed that the approximations are highly accurate for all values of TRR.

Figure 4A:
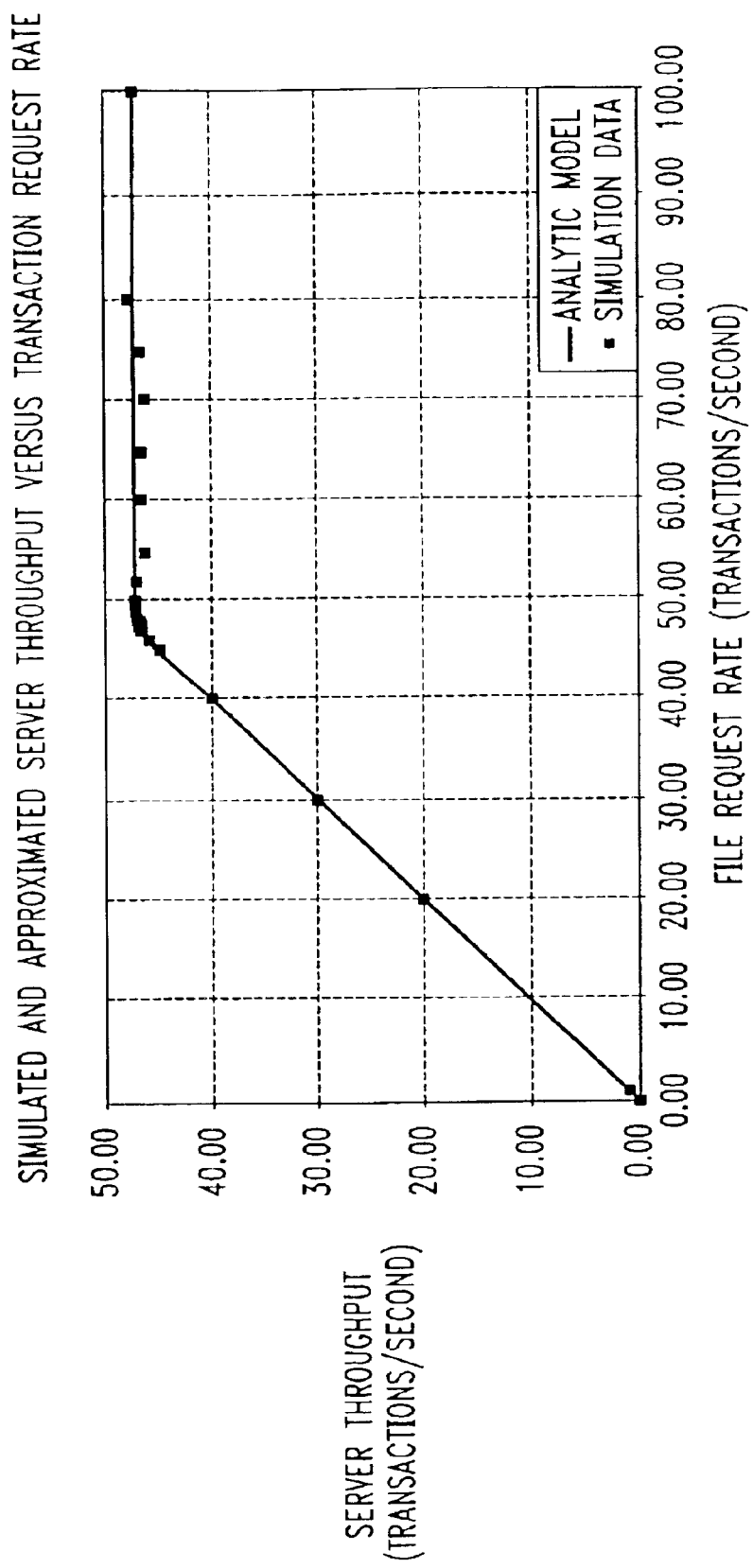

Next, consider what happens if the HTTP processing bottleneck is alleviated. This may be done, e.g., by upgrading the processor or improving caching performance, Assume that the total processor time required per file is decreased from 60 ms to 10 ms. For this scenario, FIGS. 4(*a*) and 4(*b*) depict the server throughput and response times as a function of TRR. FIG. 4(*a*) shows that by decreasing the processor time required by a factor of 6 (from 60 to 10 ms/file), the maximum throughput has increased by a factor of only about 3, suggesting that the bottleneck has moved to another sub-system. In fact, one may verify that the transport capability of the T1 connection (with a bandwidth of 1.544 Mbps) has become the limiting factor, restricting the throughput to T*=(1.544 Mbps)/(4 KB)≈47 Tps. During the simulations, blocking was also observed at the HTTP sub-system for TRR values above T*. This is caused by the fact that saturation of the network connection leads to "flooding" of the I/O buffers, which in turn implies that HTTP worker threads must wait for I/O buffers to become available, causing flooding of the HTTP sub-system and finally buffer overflow at the HTTP LQ. Again, it is observed that the approximation is reasonably accurate in the cases considered.

Figure 5A:
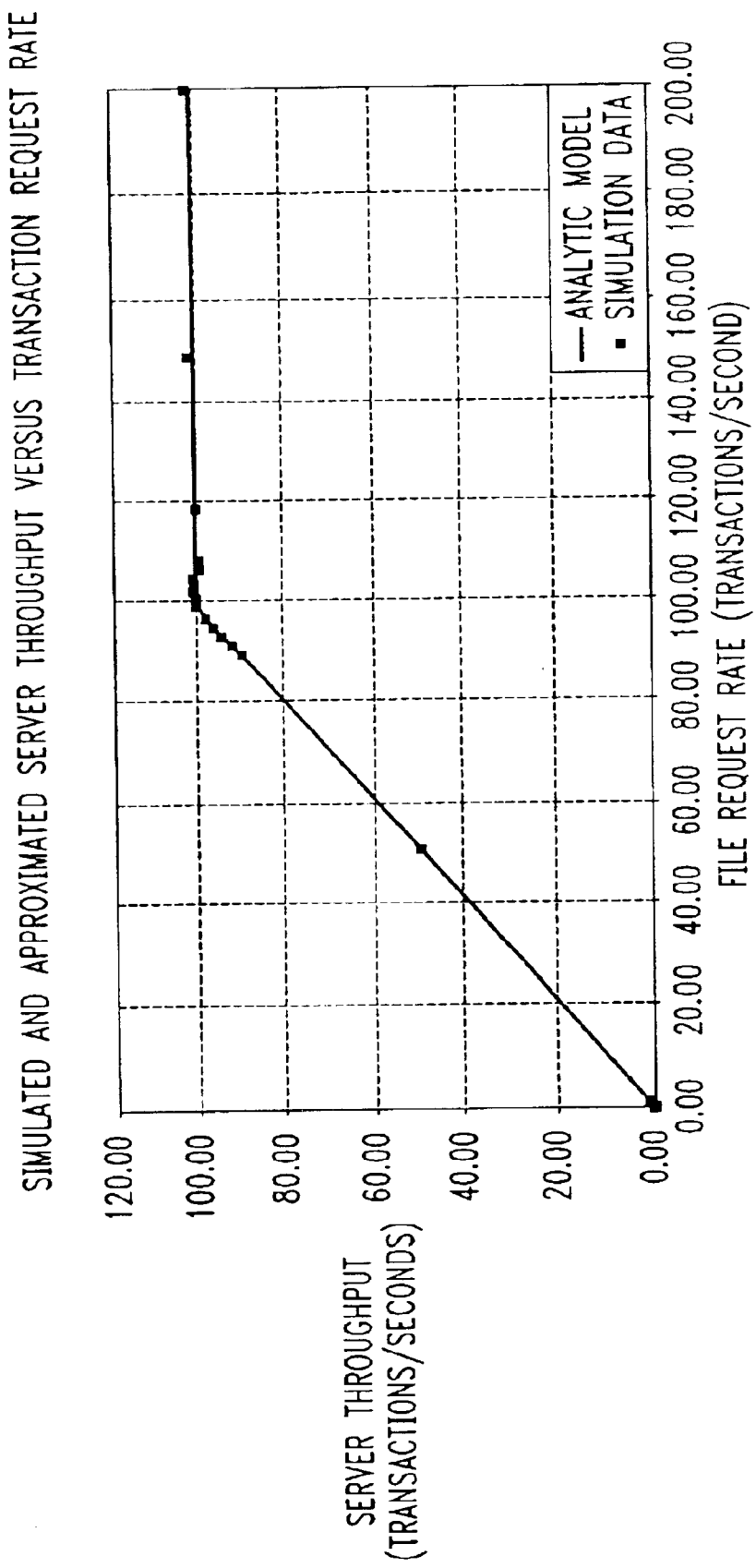
Figure 5B:
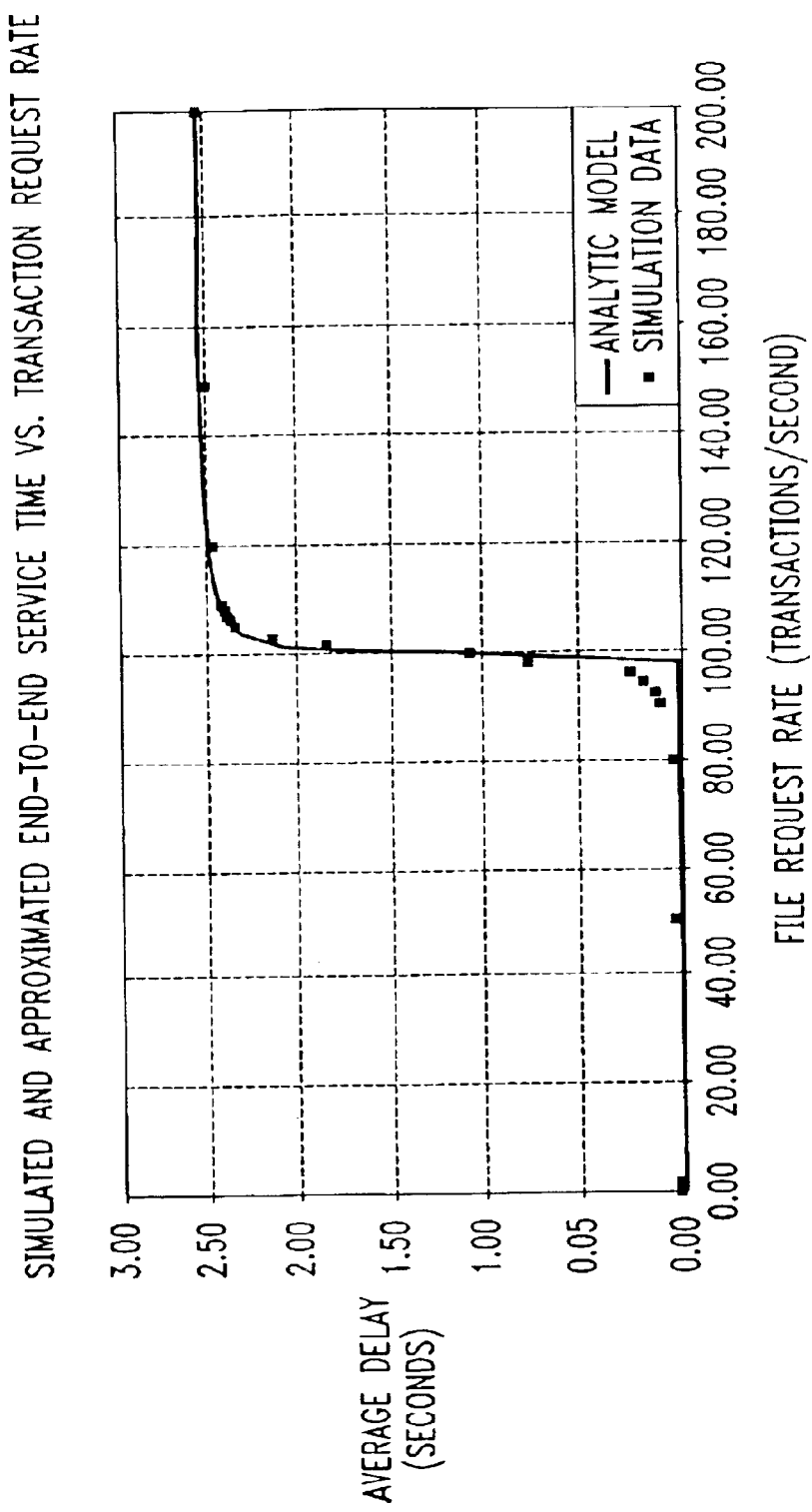

The models considered above are typical for Internet Web servers. For comparison, consider a situation where a Web server is used in an Intranet environment. The same model is considered as used for FIGS. 4(*a*) and 4(*b*), except that clients are connected to the server via a 100 Mbps LAN. It is assumed that the RTT for ACKs to move back and forth between the server and client, plus the time to read an incoming block at the client side, is exponentially distributed with an average of only 1 ms. FIGS. 5(*a*) and 5(*b*) show the results.

The results in FIGS. 5(*a*) and 5(*b*) show that the maximum throughput has increased to about 100 Tps. Since the connection bandwidth in the LAN environment considered here is much larger than in the Internet environment (where we assumed T1 connections), the draining of the I/O buffer is much faster, and the HTTP sub-system has again become the performance bottleneck. It was also observed that the end-to-end delay decreased dramatically compared to the results in the Internet environment. As was the case in the previous examples, the approximations match remarkably well with the simulation results.

The numerical results discussed in this section demonstrate that the fast approximate performance predictions based on the analytic model used in the embodiments of the invention closely approximate the results obtained via simulation using conventional techniques, but at a much faster rate.

The numerical results in the previous section reveal an interesting difference between Web servers used in an Internet versus Intranet environment. In an Intranet application, the I/O buffers are typically drained over a high-speed LAN and at a much higher rate than in an Internet environment, where the clients are usually connected to the server via a low-speed modem. More precisely, in the Intranet case, the RTT for an output file block to be sent and acknowledged (i.e., $\tau_{iob}$) is typically on the order of a few milliseconds, whereas in the Internet $\tau_{iob}$ is usually on the order of hundreds of milliseconds. Similar observations hold for the average duration $\tau_{tcp}$ of the TCP connection set-up phase. Consequently, for Internet Web servers the I/O sub-system is more likely to be a performance bottleneck than for Intranet Web servers.

The above observation also addresses a common misinterpretation of the results obtained via most commercially available Web server benchmarking tools. These tools typically generate transaction requests at a high rate and monitor the responsiveness (delay, throughput) of the Web server. In the absence of a large number of modems available for testing, the benchmarking tools emulate a large number of clients and are typically connected to the Web server over a high-speed LAN connection. Consequently, the commercial benchmarking tools only put the HTTP sub-system to a test, while the TCP and the I/O sub-systems are not stressed. Therefore, although such an approach may certainly be useful for assessing the relative performance of different Web servers, using the absolute results obtained via a LAN-connected benchmarking tool as predictions of the responsiveness of the Web servers in the Internet may lead to strongly erroneous (overly optimistic) performance predictions.

The queueing models for the different sub-systems are coupled in the sense that the impact of "downstream" congestion is captured in the arrival rates and/or service times at each sub-model as discussed in more detail above. In this way, the coupling of the sub-models reflects the dependence between the performance of the different sub-systems. To discuss the impact of the coupling of the sub-models in some more detail, suppose that the network RTT (i.e., $\tau_{tcp}$) is temporarily increased due to congestion in the Internet. As a consequence, the TCP acknowledgments (from the client to the server) of the receipt of the blocks are delayed, so that the I/O buffers are drained at a lower rate (i.e., $\tau_{iob}$ increases). This implies that I/O buffers become available to the HTTP worker thread at a lower rate, so that HTTP worker threads may have to wait (idle) for I/O buffers to become available (i.e., $\tau_{http}$ increases). This, in turn, implies that the effective throughput of the HTTP worker threads decreases, which may lead to overflow of the HTTP LQ and hence, to blocking of the incoming transaction requests. In this way, congestion in the Internet may manifest itself as blocking at the HTTP sub-system.

Figure 6:
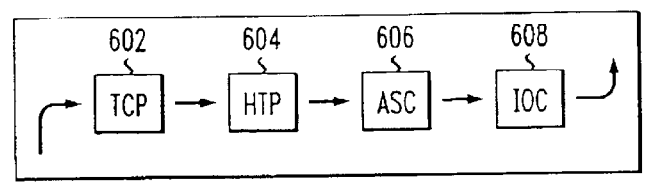
FIG. 6 illustrates the sub-elements of a Web server in accordance with one embodiment of the invention.

FIG. 6 illustrates the sub-elements of a Web server in accordance with one embodiment of the invention. FIG. 6 shows four sub-systems:

1. TCP 602, responsible for network and transport layer Transaction Control Protocol processing;
2. HTP 604, responsible for application layer Hypertext Transfer Protocol processing;
3. ASC 606, responsible for dynamic Active Script Component layer processing; and
4. IOC 608, responsible for network Input/Output Control processing.

Figure 7:
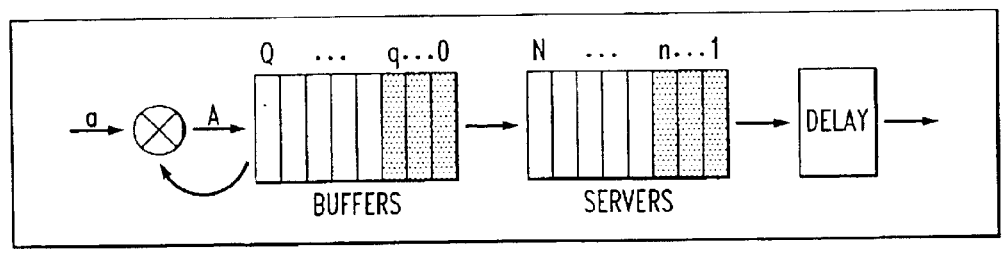
FIG. 7 illustrates a finite queue, finite server queueing system in accordance with one embodiment of the invention.

In accordance with one embodiment of the invention, each component (sub-system) shown in FIG. 6 is modeled as a finite-buffer, finite-server queueing system (shown in FIG. 7). The following notation is convenient to describe the inputs (for clarity, only the TCP-specific inputs are listed; comparable inputs exist for the HTP, ASC, and IOC sub-systems):

$\lambda_{tcp}$ denotes the initial arrival rate (in files/second) to the TCP sub-system;

$\tau_{tcp}$ the service time (in seconds) at the TCP sub-system;

$Q_{tcp}$ the total number of available buffers in the TCP sub-system;

$N_{tcp}$ the total number of available servers in the TCP sub-system;

$\pi_{retry}$ the probability of reattempt by an arrival finding all servers and buffers occupied;

$\lambda_{file}$ the initial arrival rate (in files/second) offered to the system.

The following notation is convenient to describe the outputs (again for clarity, only the TCP-specific inputs are listed):

$A_{tcp}$ denotes the total arrival rate to the TCP sub-system (including reattempts);

$S_{tcp}$ the total TCP server holding time including delays to enter the next sub-system;

$q_{tcp}$ the average number of occupied buffers in the TCP sub-system;

$n_{tcp}$ the average number of occupied servers in the TCP sub-system;

$\pi_{tcp}$ the probability that all servers are occupied (queueing);

$\beta_{tcp}$ the probability that all servers and all buffers are occupied (blocking);

$w_{tcp}$ the average waiting time (in seconds) in a TCP buffer prior to service;

$\tau_{conn}$ the average time from when the initial request arrives at the TCP sub-system until it enters service at the HTP sub-system (server connect time);

$\tau_{resp}$ the average time from when the request enters service at the HTP sub-system until the requested file departs the IOC sub-system (server response time);

$\lambda_{conn}$ the throughput rate (in files/second) of successful (served) requests;

$\lambda_{error}$ the throughput rate (in files/second) of unsuccessful (denied) requests.

Figure 8:
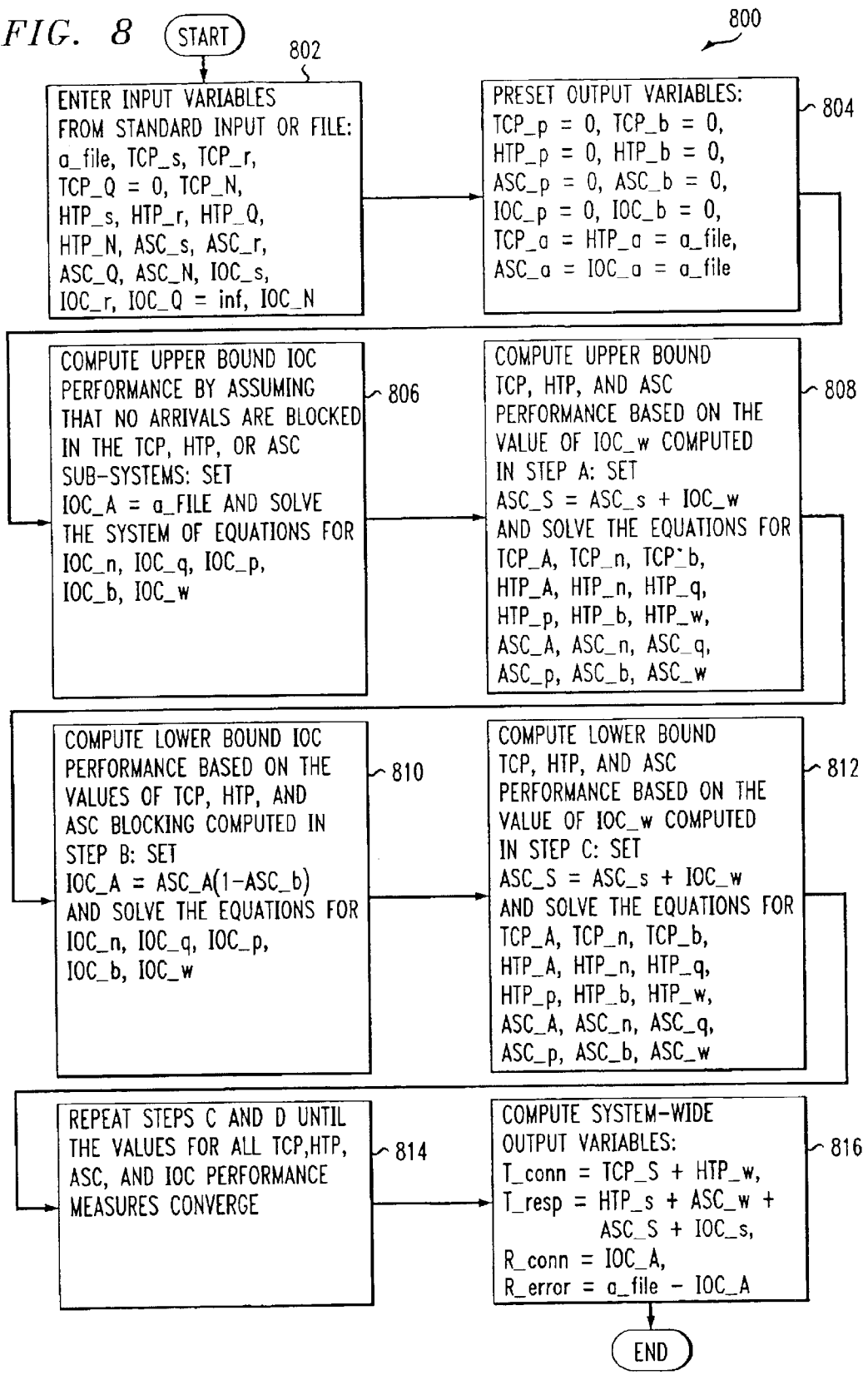
FIG. 8 illustrates a block flow diagram of an algorithm in accordance with one embodiment of the invention.

FIG. 8 illustrates a block flow diagram of an algorithm in accordance with one embodiment of the invention. Using the above notation, an algorithm 800 is solved iteratively using the following steps. At step 802, input variables are inputted from a standard input or file: a_file, TCP_s, TCP_r, TCP_Q=0, TCP_N, HTP_s, HTP_r, HTP_Q, HTP_N, ASC_s, ASC_r, ASC_Q, ASC_N, IOC_s, IOC_r, IOC_Q=inf, IOC_N. The output variables are preset at step 804 as follows: TCP_p=0, TCP_b =0, HTP_ p=0, HTP_b=0, ASC_p=0, ASC_b=0, IOC _p=0, IOC_ b=0, TCP_a=HTP_a=a_file, and ASC_a=IOC_a=a_file. The upper bound IOC performance is computed at step 806 by assuming that no arrivals are blocked in the TCP, HTP, or ASC sub-systems. This is accomplished by setting IOC_ A=a_file and solving the system of equations for IOC_n, IOC_q, IOC_p, IOC_b, and IOC_w. The performance of the upper bound TCP, HTP, and ASC is computed at step 808 based on the value of IOC_w computed in step 806. This is accomplished by setting ASC_S=ASC_s+IOC_w and solving the equations for TCP_A, TCP_n, TCP_b, HTP_ A, HTP_n, HTP_q, HTP_p, HTP_b, HTP_w, ASC_A, ASC_n, ASC_q, ASC_p, ASC_b, and ASC_w. The lower bound IOC performance is computed at step 810 based on the values of TCP, HTP, and ASC blocking computed in step 808. This is accomplished by setting IOC_A=ASC_A(1- ASC_b) and solving the equations for IOC_n, IOC_q, IOC_p, IOC_b, and IOC_w. The lower bound TCP, HTP, and ASC performance is computed at step 812 based on the value of IOC_w computed in step 810. This is accomplished by setting ASC_S=ASC_s+IOC_w and solving the equations for TCP_A, TCP_n, TCP_b, HTP_A, HTP_n, HTP_q, HTP_p, HTP_b, HTP_w, ASC_A, ASC_n, ASC_q, ASC_p, ASC_b, and ASC_w. Steps 810 and 812 are then repeated at step 814 until the values for all TCP, HTP, ASC, and IOC performance measures converge. The system-wide output variables are computed at step 816 as follows: T_conn=TCP_s+HTP_w, T_resp=HTP_s +ASC_w+ASC_S+IOC_s, R_conn=IOC_A, and R_error=a_file–IOC_A. The algorithm is then complete.

Although various embodiments are specifically illustrated and described herein, it will be appreciated that modifications and variations of the present invention are covered by the above teachings and within the purview of the appended claims without departing from the spirit and intended scope of the invention. For example, the model presented herein describes the traffic flow for HTTP version 1.0 (currently the standard). Under HTTP 1.0, a TCP connection must be established for each transaction (file) request. To overcome this inefficiency, the next HTTP standard (1.1) makes use of so-called persistent connections, i.e., TCP connections that are kept open to serve multiple HTTP transaction requests. It can be appreciated that the principles described herein can be extended to incorporate the impact of persistent connections and still fall within the scope of the invention. In another example, since pages with dynamic content are becoming increasingly popular, some servers (e.g., Microsoft's IIS server) implement dedicated processes/threads to handle dynamic content (script execution), with different thread and object scope models. It can be appreciated that the principles described herein can be used to understand the impact of thread scope and object scope on the performance of the Web server and still fall within the scope of the invention.

What is claimed is:

1. A method for modeling a web server, comprising:

identifying a plurality of sub-systems for the server, said plurality of sub-systems comprising a transaction control protocol/internet protocol (TCP/IP) sub-system, a hypertext transfer protocol (HTTP) sub-system, and an input/output (I/O) sub-system;

representing each sub-system as a queue, with each queue operably coupled together, wherein said TCP/IP sub-system comprises a first finite listen queue served by a listener daemon, said HTTP sub-system comprises a second finite listen queue served by one or more multi-threaded HTTP daemons with $N_{http}$ separate server threads, and said I/O sub-system comprises a finite number $N_{buf}$ of network buffers served by an input/output controller; and iteratively adjusting an arrival rate and a service time for each queue to account for performance by other queues.

2. The method of claim 1, further comprising an active script component sub-system.

3. The method of claim 1, wherein said input/output controller serves each network buffer using a polling system.

4. The method of claim 1, wherein said transaction control protocol/internet protocol sub-system TCP/IP is represented as an $M(\lambda_{file})/M(\tau_{tcp})/N_{tcp}/0$ blocking system.

5. The method of claim 1, wherein said hypertext transfer protocol sub-system is represented as an $M(\lambda_{http})/M(\tau_{http})/N_{http}/Q_{http}$ queuing system.

6. The method of claim 1, wherein said input/output sub-system is represented as an $M(\lambda_{buf})/M(\tau_{buf})/N_{buf}/\infty$ aqueuing system.

7. A method for modeling a web server, comprising:

(a) identifying for the server a transaction control protocol/internet protocol (TCP/IP) sub-system, a hypertext transfer protocol (HTTP) subsystem, and an input/output (I/O) sub-system;

(b) representing each sub-system as a queuing system, wherein said TCP/IP sub-system comprises a first finite listen queue served by a listener daemon, said HTTP sub-system comprises a second finite listen queue served by one or more multi-threaded HTTP daemons with $N_{http}$ separate server threads, and said I/O sub-system comprises a finite number $N_{buf}$ of network buffers served by an input/output controller;

(c) computing an upper bound performance for said I/O sub-system by assuming a first predetermined blocking value for said TCP/IP sub-system and HTTP sub-system;

(d) computing an upper bound performance for said TCP/IP sub-system and HTTP sub-system by assuming a first predetermined I/O sub-system waiting time;

(e) computing a lower bound I/O performance by assuming a second predetermined blocking value for said TCP/IP sub-system and HTTP sub-system;

(f) computing a lower bound performance for said TCP/IP sub-system and HTTP sub-system by assuming a second predetermined I/O sub-system waiting time; and (g) repeating steps (c)–(f) to generate successively tighter bounds until convergence.

8. A machine-readable medium whose contents cause a computer system to model a web server, by performing the steps of:

identifying a plurality of sub-systems for the server, said plurality of sub-systems comprising a transaction control protocol/internet protocol (TCP/IP) sub-system, a hypertext transfer protocol (HTTP) sub-system, and an input/output (I/O) sub-system;

representing each sub-system as a queue, with each queue operably coupled together, wherein said TCP/IP sub-system comprises a first finite listen queue served by a listener daemon, said HTTP sub-system comprises a second finite listen queue served by one or more multi-threaded HTTP daemons with $N_{http}$ separate server threads, and said I/O sub-system comprises a finite number $N_{buf}$ of network buffers served by an input/output controller; and iteratively adjusting an arrival rate and a service time for each queue to account for performance by other queues.

9. The machine-readable medium of claim 8, further comprising an active script component sub-system.

10. The machine-readable medium of claim 8, wherein said input/output controller serves each network buffer using a polling system.

11. The machine-readable medium of claim 8, wherein said transaction control protocol/internet protocol sub-system TCP/IP is represented as an $M(\lambda_{file})/M(\tau_{tcp})/N_{tcp}/0$ blocking system.

12. The machine-readable medium of claim 8, wherein said hypertext transfer protocol sub-system is represented as an $M(\lambda_{http})/M(\tau_{http})/N_{http}/Q_{http}$ queuing system.

13. The machine-readable medium of claim 8, wherein said input/output sub-system is represented as an $M(\lambda_{buf})/M(\tau_{buf})/N_{buf}/\infty$ queuing system.

14. A machine-readable medium for modeling a web server, comprising:

(a) identifying for the server a transaction control protocol/internet protocol (TCP/IP) sub-system, a hypertext transfer protocol (HTTP) sub-system, and an input/output (I/O) sub-system;

(b) representing each sub-system as a queuing system, wherein said TCP/IP sub-system comprises a first finite listen queue served by a listener daemon, said HTTP sub-system comprises a second finite listen queue served by one or more multi-threaded HTTP daemons with $N_{http}$ separate server threads, and said I/O sub-system comprises a finite number $N_{buf}$ of network buffers served by an input/output controller;

(c) computing an upper bound performance for said I/O sub-system by assuming a first predetermined blocking value for said TCP/IP sub-system and HTTP sub-system;

(d) computing an upper bound performance for said TCP/IP sub-system and HTTP sub-system by assuming a first predetermined I/O sub-system waiting time;

(e) computing a lower bound I/O performance by assuming a second predetermined blocking value for said TCP/IP sub-system and HTTP sub-system;

(f) computing a lower bound performance for said TCP/IP sub-system and HTTP sub-system by assuming a second predetermined I/O sub-system waiting time; and (g) repeating steps (c)–(f) to generate successively tighter bounds until convergence.

* * * * *